United States Patent [19]

Schmidtke et al.

[11] Patent Number: 5,662,539
[45] Date of Patent: Sep. 2, 1997

[54] TENSIONING DEVICE FOR A FLEXIBLE DRIVE MEMBER

[75] Inventors: Gregg S. Schmidtke; Paul Coffin, both of Fort Collins; Leslie G. Christie, Greeley, all of Colo.

[73] Assignee: Hewlett-Packard Company, Palo Alto, Calif.

[21] Appl. No.: 491,440

[22] Filed: Jun. 16, 1995

[51] Int. Cl.$^6$ ............................................. F16H 7/08
[52] U.S. Cl. ........................................................ 474/101
[58] Field of Search ............................ 474/101, 136, 474/138; 254/199

[56] References Cited

U.S. PATENT DOCUMENTS

| | | | |
|---|---|---|---|
| 66,084 | 6/1867 | Hessler | 474/138 |
| 108,761 | 11/1870 | Clover | 474/138 |
| 369,023 | 8/1887 | Newell . | |
| 1,077,339 | 11/1913 | Farrell | 474/138 |
| 1,317,150 | 9/1919 | Allmand et al. | 474/138 X |
| 1,901,635 | 3/1933 | Dunlop | 5/12 |
| 2,148,123 | 2/1939 | Hymans | 187/1 |
| 2,780,108 | 2/1957 | Bell | 74/242.8 |
| 3,948,114 | 4/1976 | Koinzan | 74/258 X |
| 4,378,713 | 4/1983 | Haskell et al. | 74/501.5 |
| 4,607,354 | 8/1986 | Ishibashi et al. | 369/39 |
| 4,653,948 | 3/1987 | Ikeda | 400/335 |
| 4,761,154 | 8/1988 | Beauchamp | 474/101 |
| 4,955,309 | 9/1990 | Ciccone | 114/230 |
| 4,993,997 | 2/1991 | Stuhler | 474/101 X |
| 4,998,232 | 3/1991 | Methlie et al. | 369/36 |
| 5,010,536 | 4/1991 | Wanger et al. | 369/36 |
| 5,014,255 | 5/1991 | Wanger et al. | 369/36 |
| 5,019,703 | 5/1991 | Boyd et al. | 250/208.1 |
| 5,043,962 | 8/1991 | Wanger et al. | 369/36 |
| 5,044,727 | 9/1991 | Steinle | 350/171 |
| 5,060,211 | 10/1991 | Blanding | 369/36 |
| 5,062,093 | 10/1991 | Christie et al. | 369/36 |
| 5,101,387 | 3/1992 | Wanger et al. | 369/36 |
| 5,184,336 | 2/1993 | Wanger et al. | 369/36 X |
| 5,232,407 | 8/1993 | Steinle | 474/101 |
| 5,277,540 | 1/1994 | Helms et al. | 414/751 |
| 5,314,043 | 5/1994 | Evezard et al. | 187/51 |
| 5,377,556 | 1/1995 | Byrnes | 74/502.6 |
| 5,455,810 | 10/1995 | Luffel | 369/36 |

FOREIGN PATENT DOCUMENTS

| | | | |
|---|---|---|---|
| 762279 | 4/1934 | France | 11/12 |
| 2094230 | 2/1972 | France . | |
| 2262234 | 9/1975 | France | 11/12 |
| 1017547 | 10/1957 | Germany | 11/12 |
| 2906615 | 9/1980 | Germany | 11/12 |
| 2135270 | 8/1984 | United Kingdom . | |

*Primary Examiner*—Roger J. Schoeppel

[57] ABSTRACT

A tensioning device for a reciprocating flexible drive system, such as a wire rope is provided. The tensioning device provides a mechanism which effectively tensions the slack side of the wire rope while directly coupling the driven side of the wire rope to the load. The tensioning device slides within a housing to a first position where force from the driven side is applied directly to the load while the slack side is tensioned with a spring. When the wire rope is reversed, the tensioning device slides to a second position within the housing where force from the driven side is once again directly applied to the load.

4 Claims, 4 Drawing Sheets

TENSIONING DEVICE FOR A FLEXIBLE DRIVE MEMBER

FIELD OF THE INVENTION

The present invention relates generally to apparatus for maintaining the proper tension in a flexible drive member, such as a wire rope drive member, and more particularly, to apparatus for maintaining the proper tension in a drive member used to provide reciprocal movement in a cartridge handling apparatus.

BACKGROUND OF THE INVENTION

Flexible drive devices are used in many applications to transfer motive force from a motor or other actuator to a moving load. Such drive devices employ tension members such as belts, cables or wire ropes to pull the load in its desired path of movement. These tension members are often driven by pulleys attached to rotary motors. Rotation of the motor causes rotation of the drive pulley which, in turn, causes movement of the tension member and its attached load. Flexible drive devices are particularly adapted to applications requiring reciprocating movement. One such reciprocating application is a cartridge handling apparatus of an optical disk storage and retrieval system. Magneto-optical disks and other types of optical disks are commonly used for storing musical works, audio-visual works, and computer-readable data. Such optical disks may be mounted in parallelepiped-shaped cartridges for purposes of storing and handling the disks.

For large databases consisting of many disk or tape cartridges, a cartridge handling system may be provided for handling and storing the cartridges. Various features and components of cartridge handling systems are disclosed in U.S. Pat. No. 4,998,232 issued Mar. 5, 1991 of Methlie, Oliver, Stayely, and Wanger; U.S. Pat. No. 5,062,093 issued Oct. 29, 1991 of Christie, Wanger, Dauner, Jones and Domal; U.S. patent application Ser. No. 08/491,286 of Schmidtke, Coffin, Paul, and Christie for MEDIA CARTRIDGE INSERTION APPARATUS FOR A MEDIA CARTRIDGE STORAGE AND HANDLING SYSTEM, filed on the same day as this application; and in U.S. patent application Ser. No. 08/491,538 of Paul and Smith for DOOR ASSEMBLY FOR A CARTRIDGE HANDLING DEVICE, filed on the same day as this application, which are hereby specifically incorporated by reference for all that is disclosed therein. Optical disk cartridge handling systems are generally referred to in the industry as "autochangers" or "optical disk juke boxes".

In general, a cartridge handling system may include a cartridge carrier for transporting cartridges between a user interface position located at the exterior of the storage and handling system and a system interface position located at the interior of the storage and handling system. The cartridge carrier may be reciprocally displaced between these two positions by one or more elongate flexible members (e.g., cables, belts, bands, or the like) under tension. Generally, each elongate flexible member is initially placed under tension upon mounting of the flexible member within the system, and that tensile force is maintained by applying a biasing force to the flexible member. Such a biasing force may be provided, for example, by including a biasing device in association with pulleys upon which a flexible member is mounted. In many flexible drive member applications, and particularly in the cartridge handling systems described above, space is severely limited. Accordingly, biasing devices for use in such systems must be extremely compact and efficient.

Various features and components of flexible member tensioning devices are disclosed in U.S. Pat. No. 5,232,407 issued Aug. 3, 1993 of Wolf and Boyd and in copending U.S. patent application Ser. No. 08/254,049 filed Jun. 3, 1994 of Luffel for FLEXIBLE MEMBER TENSIONING APPARATUS, which are hereby specifically incorporated by reference for all that is disclosed therein.

In a flexible drive system, such as a wire rope drive system, it is important that proper tension be maintained in the wire rope as the device operates.

In either direction of movement, the driven portion of the wire rope is pulled along due to frictional contact between the wire rope and the rotating drive pulley of the motor or other actuating device. The amount of force that can be transferred to the wire rope by the motor is directly dependent upon the amount of frictional force available. To achieve adequate frictional force, it is desirable to maintain proper tension in the slack side of the wire rope. This tension ensures that the wire rope will maintain contact with the motor drive pulley. Such tension is also desirable to ensure that the wire rope does not become lose enough to "derail" from either the drive pulley or from one or more idler pulleys located within the system.

It is, therefore, desirable to locate a spring or other type of tensioning device on the slack side of a wire rope. It is generally undesirable, however, to locate such a tensioning device on the driven side of the wire rope. On the driven side, a direct non-resilient connection is desirable between the motor and the load in order to provide maximum motive force.

This presents a problem since, in a reciprocating drive system, the slack side and the driven side switch positions each time the drive system reverses. Accordingly, a conventional type of tensioning device will be located on the driven side during at least one direction of travel.

Thus, it would be generally desirable to provide an apparatus which overcomes these problems associated with flexible drive member tensioning devices.

SUMMARY OF THE INVENTION

The present invention is directed to a tensioning device for a flexible drive system, such as a wire rope. The tensioning device provides a mechanism which effectively tensions the slack side of the wire rope while directly coupling the driven side of the wire rope to the load.

As the drive system motor begins rotation in a first direction, the tension in the driven side of the wire rope causes the tensioning device to slide within a housing to a position where force from the driven side is applied directly to the load while the slack side is tensioned with a spring. Upon rotation of the motor in the opposite direction, tension in the driven side of the wire rope causes the tensioning device to slide in the opposite direction to a position where force from the driven side is once again applied directly to the load while the slack side is tensioned with the spring.

The tensioning device is extremely compact, allowing it to fit within the size limitations imposed by conventional flexible drive member applications. The device is configured so that all movement is colinear with the path of movement of the wire rope itself.

DETAILED DESCRIPTION OF THE PREFERRED EMBODIMENT OF THE INVENTION

Figure 1:
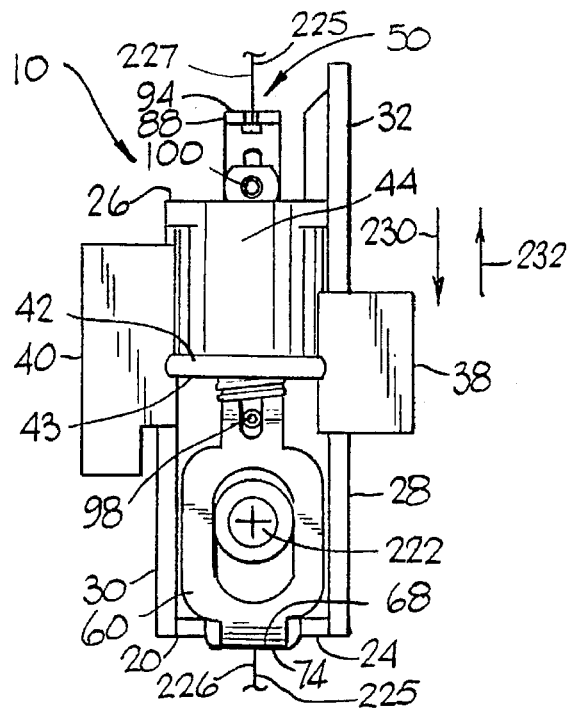
FIG 1 is a top plan view of a flexible drive member tensioning device in a first position.
Figure 2:
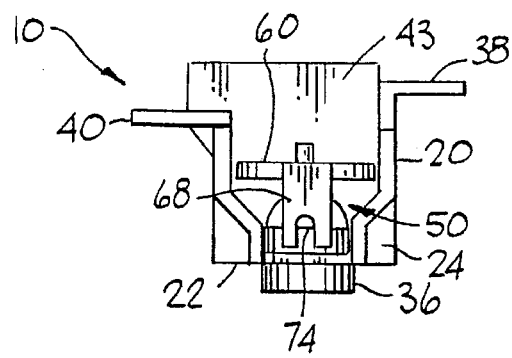
FIG. 2 is front elevation view of the tensioning device of FIG. 1.
Figure 3:
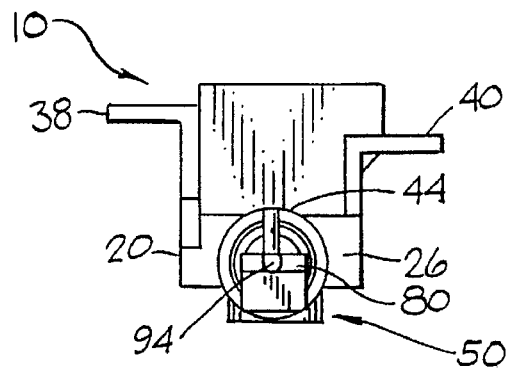
FIG. 3 is rear elevation view of the tensioning device of FIG. 1.

FIGS. 1–9 illustrate a tensioning apparatus 10 for a flexible drive member 225. The tensioning apparatus includes a first elongate member 60 having a first end 68 connected to the flexible drive member 225 and a second end 69 containing a first pin member 100. The first elongate member 60 has a first intermediate portion 71 between its ends. This first intermediate portion contains a first elongate slot 70. A second elongate member 80 is also provided which has a first end 88 connected to the flexible drive member 225 and a second end 89 containing a second pin member 98. The second elongate member 80 has a second intermediate portion 91 between the ends thereof. This second intermediate portion contains a second elongate slot 90. The first and second elongate members 60, 80 are arranged in overlying relationship with the first pin member 100 located in the second slot 90 and the second pin member 98 located in said first slot 70. A spring 96 is located between the first and second pins 100, 98.

Also illustrated in FIGS. 1–9 is a method of moving a load 212 along a path of movement 217 with a flexible drive member 225 which includes the steps of providing a tensioning apparatus 50 connected to the flexible drive member 225; providing a housing 20 having a path of movement 217, the housing 20 being attached to the load 212 and having a first surface 26 and an oppositely facing second surface 43; contacting the first surface 26 of the housing 20 with the tensioning apparatus 50 to induce movement of the housing 20 in a first direction 230 along said path 217; moving the tensioning apparatus 50 out of contact with the first surface 26 of the housing 20; contacting the second surface 43 of the housing 50 with the tensioning apparatus 50 to induce movement of the housing 50 in a second direction 232 along the path 217.

Having thus described the tensioning apparatus 10 in general, various features of the apparatus will now be described in further detail.

Figure 9:
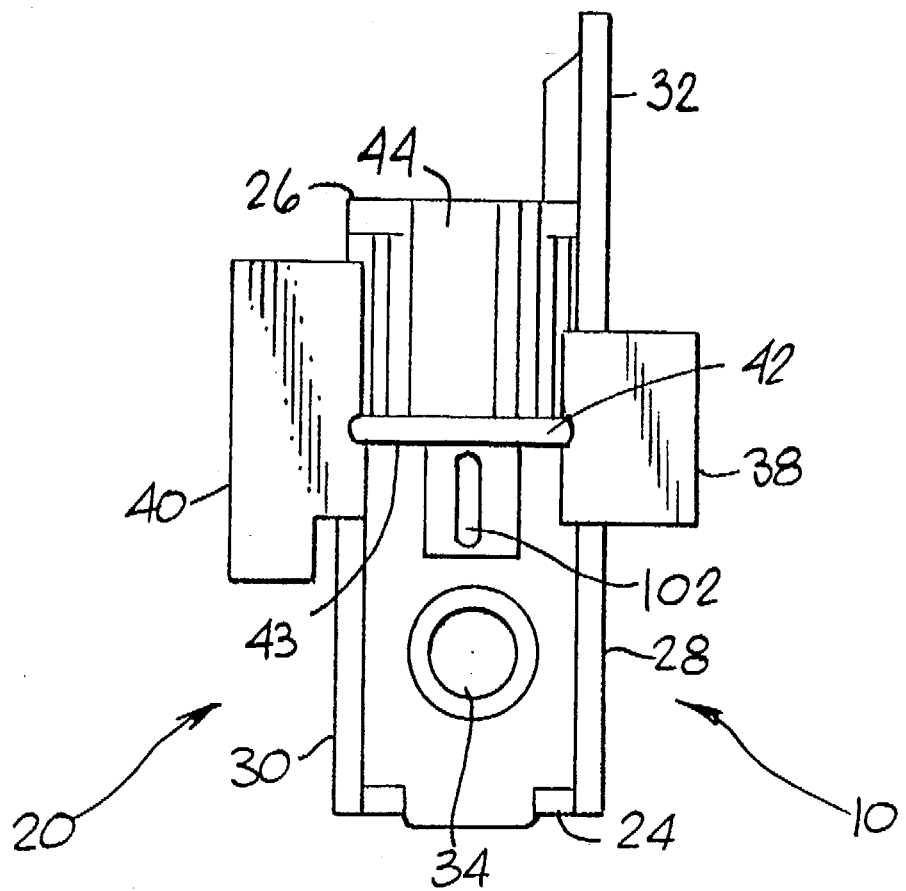
FIG. 9 is a top plan view of a housing portion of the tensioning device of FIG. 1.

As best illustrated in FIG. 9, the tensioning apparatus 10 may comprise a generally parallelepiped-shaped housing 20. The housing has a bottom surface portion 22, FIG. 2, a front lateral surface 24, a rear lateral surface 26, and opposite lateral side surfaces 28, 30. The housing may also be provided with a rearwardly extending member 32.

A hole 34 is provided in the bottom surface 22 of the housing 20. This hole 34 also extends through a projection 36 located on the bottom surface 22, FIG. 2. Housing 20 may also include first and second tabs 38 and 40. A wall member 42 is provided between the tabs 38 and 40 and provides additional strength and rigidity to the tabs. Wall member 42 has a forwardly facing surface 43.

A hollow cylindrical portion 44 is also provided on housing 20 located between the wall member 42 and the rear wall 26. This cylindrical portion 44 houses a spring assembly 50 as will now be described in detail.

Figure 5:
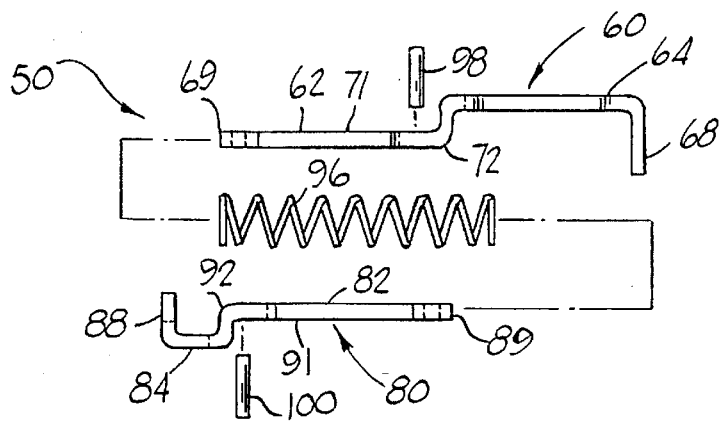
FIG. 5 is a side elevation exploded view of a spring assembly of the tensioning device of FIG. 1.
Figure 6:
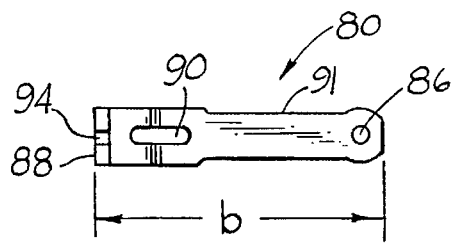
FIG. 6 is a top plan view of a portion of a spring assembly of the tensioning device of FIG. 1.
Figure 7:
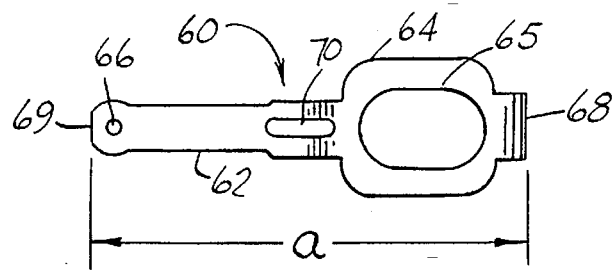
FIG. 7 is a top plan view of another portion of a spring assembly of the tensioning device of FIG. 1.

As best shown in FIGS. 5–7, spring assembly 50 includes an upper member 60 and a lower member 80. Upper member 60 is a generally key-shaped structure having a first narrow end 62 and a second wider end 64. Wider end 64 may be raised slightly above narrow end 62 as best shown in FIG. 5. The wider end 64 contains an opening 65 therethrough as best shown in FIG. 7. Upper member 60 may have a hole 66 at one end and a downwardly extending portion 68 at the other end thereof. A slot 70 extends through the narrow end 62 and may span the transition region 72 between the narrow end 62 and the wider end 64. The downwardly extending portion 68 of the upper member 60 is provided with a notch 74, FIG. 2, to facilitate attachment to a wire rope as will be explained in more detail. The upper member 60 may have a length "a" of about 49.5 mm. The slot 70 may have a length of about 7.5 mm and a width of about 2.25 mm.

Lower member 80 may comprise a generally parallelepiped-shaped structure having an upper portion 82 and an offset lower portion 84, FIG. 5. Lower member 80 may have a hole 86 at one end and an upwardly extending portion 88 at the other end thereof. A slot 90 extends through the upper portion 82 and may span the transition region 92 between the upper portion 82 and the lower portion 84. The upwardly extending portion 88 of the lower member 80 is provided with a notch 94 to facilitate attachment to a wire rope as will be explained in more detail. The lower member 80 may have a length "b" of about 33.23 mm. The slot 90 may have a length of about 7.5 mm and a width of about 2.25 mm. Both upper member 60 and lower member 80 may be formed of a low carbon cold-rolled steel and have a thickness of about 1.6 mm.

Spring assembly 50 also includes a spring 96 which surrounds the lower member 80 and the narrow end 62 of the upper member 60, FIG. 5. Spring 96 may be a compression spring having an outside diameter of 0.360 inches and a free length of about 1.75 inches. The spring may be formed of music wire having a diameter of about 0.035 inches and may have a spring constant of about 6.3 pounds per inch.

Referring to FIG. 5, a first pin 98 is press-fit into the hole 86 in lower member 80 and extends through the slot 70 in upper member 60. A second pin 100 is press-fit into the hole 66 in the upper member 60 and extends through the slot 90 in the lower member 80. Once the spring assembly 50 is assembled, the spring 96 is held in compression between the pins 98 and 100. Accordingly, it can be seen that the notched ends 68 and 88 of the upper and lower members 60, 80 are urged towards each other by the force of the spring 96.

Figure 4:
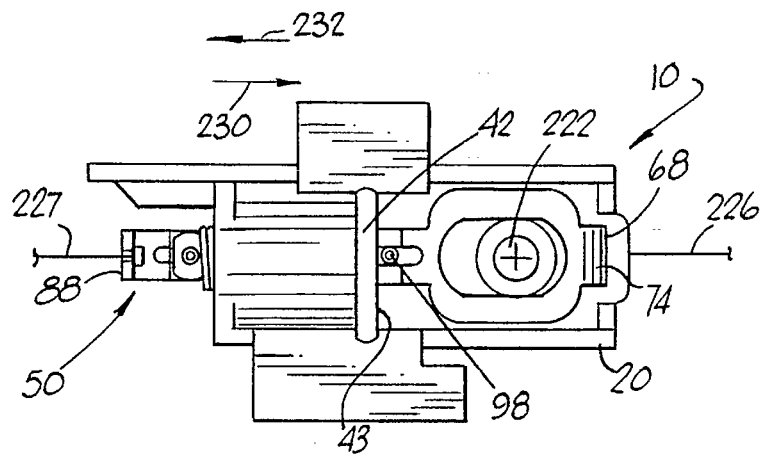
FIG. 4 is a top plan view of a flexible drive member tensioning device in a second position.

To assemble the spring assembly 50 and housing 20 of the tensioning apparatus 10, the upper member 60 is first inserted into the housing 20 in the orientation shown in FIGS. 1 and 4. The spring 96 is then placed around the lower member 80. The lower member 80 is then inserted into the housing 20 into underlying relationship with the upper member 60 with the spring 96 encircling both the lower member 80 and the narrow end 62 of the upper member 60. With the spring compressed, the pins 98, 100 are then inserted as previously described.

Assembled in this manner, the spring assembly 50 is free to slide within the cylindrical portion 44 of the housing 20 between the forwardly displaced position shown in FIG. 1 and the rearwardly displaced position shown in FIG. 4. A slot 102, FIG. 9, is provided in the lower wall 22 of housing 20 to accommodate the first pin 98 and enable such sliding.

In the rearwardly displaced position shown in FIG. 4, further rearward movement of the spring assembly 50 relative to the housing 20 is prevented by contact between the first pin 98 and the housing wall member 42 as shown. In the forwardly displaced position shown in FIG. 1, further forward movement of the spring assembly 50 relative to the housing 20 is prevented by contact between the second pin 100 and the housing rear wall 26 as shown.

Figure 8:
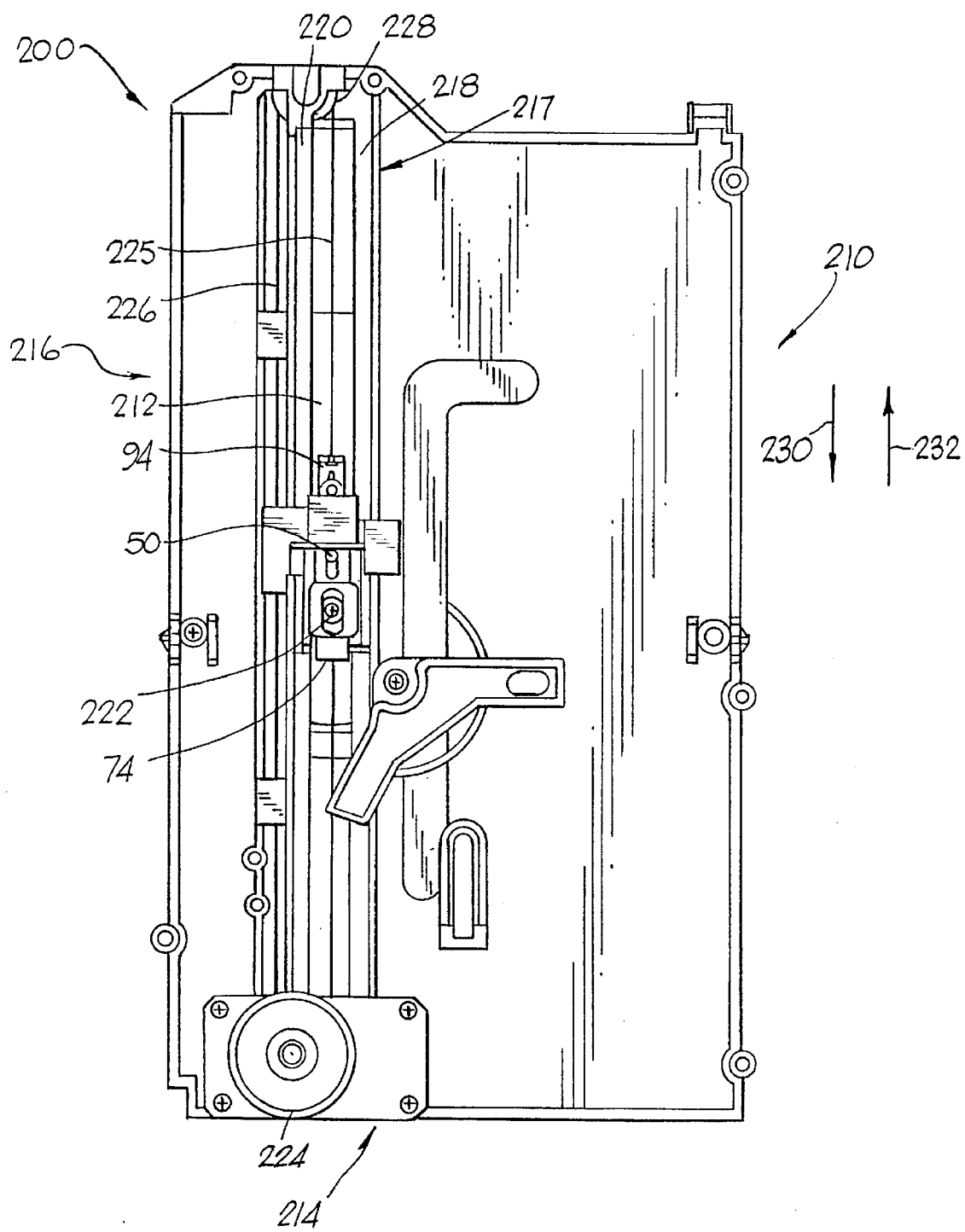
FIG. 8 is a top plan view of the tensioning device of FIG. 1 installed in a cartridge handling device.

FIG. 8 shows the tensioning apparatus 10 mounted for translational movement in a device, e.g., a cartridge handling device 200. The cartridge handling device 200 may include a housing 210 and a cartridge carrier 212. Cartridge carrier 212 may function to shuttle cartridges, such as optical disk cartridges, between a forward end 214 to a rear, side portion 216 of the housing 210. A track 217 is provided in the housing 210 and may comprise two L-shaped members 218, 220.

In operation, the bottom wall 22 of the tensioning apparatus housing 20 is slidingly guided along the bottom portions of the L-shaped members 218, 220 of the track 217. The side walls 28, 30 of the tensioning apparatus housing 20 fit within the upright portions of the L-shaped members 218, 220. In this manner, the tensioning apparatus 10 is restricted from lateral movement and, thus, constrained to longitudinal movement along the track 217.

A screw or similar connection device 222 is located in the hole 34 of the housing 20 and attached to the underlying cartridge carrier 212 of the cartridge handling device 200. In this manner, the tensioning apparatus 10 is attached to the cartridge carrier 212 and movement of the tensioning apparatus 10 along the track 217 will result in corresponding movement of the cartridge carrier 212.

A motor 224 is provided at the forward end of the cartridge handling device housing 210. Attached to motor 224 is a drive pulley, not shown, which drives a wire rope 225. An idler pulley 228 is provided at the rear of the housing 210 in order to guide the wire rope 225. Wire rope 225 has a first end 226, FIGS. 1 and 4, which is attached to the notch 74 of the tensioning apparatus spring assembly 50. Wire rope 225 has a second end 227 which is attached to the notch 94 of the tensioning apparatus spring assembly 50.

Accordingly, it can be seen that clockwise rotation of the motor 224 will result in clockwise rotation of the wire rope 225 and forward movement of the tensioning apparatus 10 along the track 217. In a similar manner, it can be seen that counter-clockwise rotation of the motor 224 will result in counter-clockwise rotation of the wire rope 225 and rearward movement of the tensioning apparatus 10 along the track 217. In this manner, the motor 224 is able to effect reciprocal movement of the tensioning apparatus 10 and the attached cartridge carrier 212.

In a wire rope drive system, such as the one described above with reference to FIG. 8, it is important that proper tension be maintained in the wire rope as the device operates. When the tensioning apparatus 10 is being driven in a forward direction, as indicated by the arrow 230 in FIG. 8, the section of wire rope 225 located between the drive pulley of the motor 224 and the notch 74 at the front of the tensioning apparatus 10 is the "driven" portion of the wire rope. This driven portion actually provides the motive force to move the tensioning apparatus 10 and attached cartridge carrier 212. The section of wire rope 225 located between the drive pulley of the motor 224 and the notch 94 at the rear of the tensioning apparatus 10 is the "slack" portion of the wire rope.

Conversely, when the tensioning apparatus 10 is being driven in a rearward direction, as indicated by the arrow 232 in FIG. 8, the section of wire rope 225 located between the drive pulley of the motor 224 and the notch 94 at the rear of the tensioning apparatus 10 is the "driven" portion of the wire rope. The section of wire rope 225 located between the drive pulley of the motor 224 and the notch 74 at the front of the tensioning apparatus 10 becomes the "slack" portion of the wire rope.

In either direction of movement, the driven portion of the wire rope is pulled along due to frictional contact between the wire rope 225 and the rotating drive pulley of the motor 224. The amount of force that can be transferred to the wire rope by the motor 224 is directly dependent upon the amount of frictional force available. To achieve adequate frictional force, it is desirable to maintain proper tension in the slack side of the wire rope. This tension ensures that the wire rope will maintain contact with the motor drive pulley. Such tension is also desirable to ensure that the wire rope does not become lose enough to "derail" from either the drive pulley or from the idler pulley 228.

It is, therefore, desirable to locate a spring or other type of tensioning device on the slack side of a wire rope. It is generally undesirable, however, to locate such a tensioning device on the driven side of the wire rope. On the driven side, a direct non-resilient connection is desirable between the motor and the load in order to provide maximum motive force. The tensioning apparatus 10 provides a mechanism which effectively tensions the slack side of the wire rope 225 while directly coupling the driven side of the wire rope 225 to the load as will now be described in detail.

In operation, as the motor 224 begins clockwise rotation, the wire rope attached to notch 74 of upper member 60 pulls the spring assembly 50 and causes it to slide within the tensioning apparatus housing 20 to its fully forward position as shown in FIG. 1. At this point, the pin 100, attached to the upper member 60, comes into contact with the rear wall 26 of the housing 20. Accordingly, the force supplied by the driven side of the wire rope 225 is transmitted through the upper member 60 and then directly to the housing 20 via the rear wall 26. Since the housing 20 is attached to the load (cartridge carrier 212), force is directly applied from the motor 224 to the load with no intervening springs or other tensioning devices.

The slack side of the wire rope 225, however, is kept in proper tension by the spring 96 of the spring assembly 50. The slack side of the wire rope 225 is attached to the notch 94 of lower member 80. The spring 96, captured between the pins 98, 100 urges the lower member 80 in the direction of arrow 230 and thus applies a force in the same direction to the slack side of the wire rope 225. It is noted that, when tensioning apparatus 10 is assembled into the cartridge handling device housing 210, the spring 96 is initially slightly compressed to allow the notches 74 and 94 to reach the ends of the wire rope 225, as illustrated in FIGS. 1 and 4.

As the motor 224 reverses and begins counter-clockwise rotation, the second end 227 of wire rope 225 attached to notch 94 of lower member 80 pulls the spring assembly 50 and causes it to slide within the tensioning apparatus housing 20 to its fully rearward position as shown in FIG. 4. At this point, the pin 98, attached to the lower member 80, comes into contact with the surface 43 of housing wall member 42. Accordingly, the force supplied by the driven side of the wire rope 225 is transmitted through the lower member 80 and then directly to the housing 20 via the wall member 42. Since the housing 20 is attached to the load (cartridge carrier 212), force is directly applied from the motor 224 to the load with no intervening springs or other tensioning devices.

The slack side of the wire rope 225, however, is kept in proper tension by the spring 96 of the spring assembly 50. The slack side of the wire rope 225 is attached to the notch 74 of upper member 60. The spring 96, captured between the pins 98, 100 urges the upper member 60 in the direction of arrow 232 and thus applies a force in the same direction to the slack side of the wire rope 225.

Accordingly, it can be seen that the tensioning apparatus 10 allows force supplied by the driven side of a wire rope to be directly coupled to a load while the slack side is appropriately tensioned in both directions of travel. The tensioning apparatus 10 is also extremely compact, with all movements being constrained to the path of travel of the wire rope.

Configuring spring 96 as a compression spring lends to the compact size of the tensioning apparatus 10. Extension springs generally require the use of end clips or other attachment mechanisms which take up space. The compression spring 96, however, requires no such attachment mechanisms and is able to simply abut the pins 98, 100 as previously described. The use of attachment mechanisms on extension springs also tends to increase the effective length of the spring. This is undesirable since shorter springs generally have a higher spring rate than longer springs.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art. For example, although a cartridge handling wire rope drive tensioning system has been specifically described, it is to be understood that the invention applies to any flexible drive member tensioning system including, for example, belts or cables used in any type of application having a configuration which necessitates tensioning of the flexible drive member.

What is claimed is:

1. A tensioning device for a flexible drive member having a first end portion and a second end portion comprising:

a first elongate member having a first end connected to said flexible drive member first end portion and a second end containing a first pin member;

said first elongate member having an intermediate portion between said ends thereof, said first elongate member intermediate portion containing an elongate slot;

a second elongate member having a first end connected to said flexible drive member second end portion and a second end containing a second pin member;

said second elongate member having an intermediate portion between said ends thereof, said second elongate member intermediate portion containing an elongate slot;

said first and second elongate members being arranged in overlying relationship with said first pin member located in said second elongate member intermediate portion slot and said second pin member located in said first elongate member intermediate portion slot; and a biasing member compressed between said first and second pin members.

2. The apparatus of claim 1 wherein said biasing member comprises a spring.

3. The apparatus of claim 2 wherein said spring is a compression spring.

4. The apparatus of claim 2 wherein said tensioning device has a path of movement and said spring has a spring axis substantially colinear with said path of movement.

* * * * *